US006133203A

United States Patent [19]

Estes et al.

[11] Patent Number: 6,133,203

[45] Date of Patent: Oct. 17, 2000

[54] DRILLING FLUIDS AND ADDITIVES THEREFOR

[75] Inventors: Brent L. Estes, Houston, Tex.; Cory J. Bernu, Farmington, Minn.

[73] Assignee: Halliburton Energy Services, Inc., Duncan, Okla.

[21] Appl. No.: 09/282,896

[22] Filed: Mar. 31, 1999

Related U.S. Application Data

[60] Provisional application No. 60/080,484, Apr. 2, 1998.

[51] Int. Cl.[7] .............................. E21B 33/02; C09K 7/02

[52] U.S. Cl. .......................... 507/209; 507/211; 507/212; 507/213; 507/110; 507/111

[58] Field of Search .................................... 507/209, 211, 507/212, 213, 110, 111

[56] References Cited

U.S. PATENT DOCUMENTS

| | | | |
|---|---|---|---|
| 2,853,484 | 9/1958 | Lolkema et al. | 260/233.5 |
| 2,935,510 | 5/1960 | Wurzburg | 260/233.3 |
| 3,555,009 | 1/1971 | Suzuki et al. | 260/233.5 |
| 3,951,947 | 4/1976 | Schanefelt et al. | 260/233.3 |
| 4,016,354 | 4/1977 | Greenwood | 536/111 |
| 4,021,355 | 5/1977 | Holymeyer | 507/111 |
| 4,105,461 | 8/1978 | Racciato | 106/205 |
| 4,123,366 | 10/1978 | Sauber et al. | 252/8.5 A |
| 4,175,042 | 11/1979 | Mondshine | 507/207 |
| 4,186,803 | 2/1980 | Mondshine | 166/292 |
| 4,296,234 | 10/1981 | Mindt et al. | 536/47 |
| 4,369,843 | 1/1983 | Mondshine | 166/292 |
| 4,422,947 | 12/1983 | Dorsey et al. | 252/8.5 C |
| 4,427,556 | 1/1984 | House et al. | 507/110 |
| 4,428,972 | 1/1984 | Wurzburg et al. | 426/578 |
| 4,600,515 | 7/1986 | Gleason et al. | 252/8.5 A |
| 4,652,384 | 3/1987 | Francis et al. | 252/8.51 |
| 4,822,500 | 4/1989 | Dobson, Jr. et al. | 507/212 |
| 4,841,040 | 6/1989 | Just et al. | 536/105 |
| 4,940,741 | 7/1990 | De Wacker et al. | 524/47 |
| 4,988,450 | 1/1991 | Wingrave et al. | 252/8.514 |
| 5,085,228 | 2/1992 | Mooney et al. | 131/37 |
| 5,132,285 | 7/1992 | Tsai | 507/121 |
| 5,164,433 | 11/1992 | Ricci et al. | 524/47 |
| 5,185,176 | 2/1993 | Chiu | 426/651 |
| 5,192,576 | 3/1993 | Chang et al. | 426/578 |
| 5,470,968 | 11/1995 | Katcher et al. | 536/102 |
| 5,616,541 | 4/1997 | Dobson, Jr. et al. | 507/145 |
| 5,641,728 | 6/1997 | Dobson, Jr. et al. | 507/111 |
| 5,658,859 | 8/1997 | Burba, III et al. | 507/111 |
| 5,728,652 | 3/1998 | Dobson, Jr. et al. | 507/145 |
| 5,804,535 | 9/1998 | Dobson et al. | 507/111 |
| 5,851,959 | 12/1998 | Bernu | 507/111 |

FOREIGN PATENT DOCUMENTS

| | | | |
|---|---|---|---|
| 0 852 235 A2 | 7/1988 | European Pat. Off. | C08B 31/00 |
| 0 770 660 A1 | 5/1997 | European Pat. Off. | C09K 7/02 |
| 2086923 | 5/1982 | United Kingdom . | |

*Primary Examiner*—Jill Warden
*Assistant Examiner*—LaToya Cross
*Attorney, Agent, or Firm*—Craig W. Roddy; Karen B. Tripp

[57] ABSTRACT

A process and composition are provided for permeability reduction in a hydrocarbon-bearing formation to improve hydrocarbon recovery therefrom. A moderately epichlorohydrin cross-linked, non-hydroxylpropylated starch is derived from high amylopectin waxy maize starch for use in drilling, workover and completion fluids. The starch is combined with xanthan gum and used in solutions of fresh water, non-saturated brine or saturated brine containing sized salt particles, typically sodium chloride, of various sizes, or sized calcium carbonate, or a combination of sized salt and sized calcium carbonate.

14 Claims, No Drawings

DRILLING FLUIDS AND ADDITIVES THEREFOR

RELATED APPLICATION

This application claims priority to U.S. Provisional Patent Application Serial No. 60/080,484 filed Apr. 2, 1998.

TECHNICAL FIELD OF THE INVENTION

The invention relates, generally, to fluids used for drilling, completion and workover of oil, gas and geothermal wells in earth formations, and to additives for use in such fluids. More particularly, the invention relates to a new and improved starch which can be used to improve various qualities of such fluids, for example, to control filtrate losses.

BACKGROUND OF THE INVENTION

It is well known in the art involving fluids used in the drilling, completion and workover of wells in earth formations, to include either a fresh water solution, or a non-saturated brine solution, or a saturated brine solution, polymers, starches and bridging solids, for example, as discussed in the SPE Paper No. 35332, entitled "Design and Application of Brine-based Drilling Fluids", authored by R. Swarthout and R. Pearcy, presented at the International Petroleum Conference and Exhibition in Mexico, in Villahermosa, Mexico, Mar. 5–7, 1996. The completion of workover fluids using similar formulations are also discussed in U.S. Pat. Nos. 4,822,500; 4,175,042; 4,186,803 and 4,369,843.

U.S. Pat. No. 4,822,500 makes use of starch which is considered to be an epichlorohydrin crosslinked, hydroxypropyl starch manufactured from a low amylopectin maize starting material. This patent also discloses the combination of xanthan gum with the low amylopectin starch, as well as particle solids such as sized salt, for example, sized sodium chloride, in formulating well treating fluids.

Moreover, British Patent No. 2,086,923 assigned to Baroid Technology, Inc., the assignee of this present application, discloses the combination of various polysaccharide gums, such as xanthan gum, with various starch derivatives. On page 3 of the British Patent No. 2,086,923, for example, there is teaching that exemplary starch derivatives are the carboxyalkyl starch ethers such as carboxymethyl starch and carboxyethyl starch; hydroxyalkyl starch esters, such as hydroxethyl starch and hydroxypropyl starch; and mixed starch ethers such as: carboxylalkyl hydroxyalkyl starch, e.g., methyl hydroxyethyl starch; alkyl carboxyalkyl starch, e.g., ethyl carboxymethyl starch. Exemplary polysaccharide gums include: the bipolymers such as xanthomonas (xanthan) gum; galactomannan gums, such as guar gum, locust bean gum, tara gum; glucomannan gums; and derivatives thereof, particularly the hydroxyalkyl derivates. For other exemplary polysaccharide gums see U.S. Pat. Nos. 4,021,355 and 4,105,461. Especially preferred hydrophilic polymers are xanthan gum (XC polymer), carboxymethyl cellulose and hydroxyethel starch.

Various other starches can also be used in formulating drilling, completion and workover fluids, as is well known in this art, for example, as discussed in *Composition and Properties of Oil Well Drilling Fluids*, Fourth Edition, published by Gulf Publishing Co., Houston, Tex., 1980, authored by George R. Gray, H. C. H. Darley and Walter F. Rogers, at its pages 548–552. The use of xanthan gum in such fluids is also discussed in the same reference, pages 554–556.

SUMMARY OF THE INVENTION

The invention comprises, generally, a new and improved non-hydroxypropyl, epichlorohydrin crosslinked, high amylopectin, waxy maize starch having special utility as an additive for the drilling, completion and workover fluids used in oil, gas and geothermal wells.

As another feature of the invention, the non-hydroxypropyl, epichlorohydrin cross-linked, high amylopectin, waxy maize starch is combined with xanthan gum with the combination having special utility as an additive for drilling, completion and workover fluids used in oil, gas and geothermal wells.

DETAILED DESCRIPTION OF THE INVENTION

The process of the present invention comprises preparing fluids for drilling, completion and workover of well bores, drilling the borehole, circulating such fluids during the drilling of the borehole, and completing the preparation of the well bore.

Amylopectin is the term used to describe the outer, almost insoluble portion of starch granules. Amylopectin is a hexosan, a polymer of glucose, and is a branched molecule of many glucose units, with a molecular weight distribution of 40,000 to 100,000. Amylose, on the other hand, is the inner, relatively soluble portion of starch granules, and is a hexosan, a polymer of glucose, and consists of long straight chains of glucose units, with a molecular weight ranging from 10,000 to 100,000, joined by a 1,4-glycosidic linkage. Generically, the starches used in the present invention are manufactured using maize as the starting material. So-called regular maize (corn) contains approximately 74% amylopectin and 26% amylose. Waxy maize is almost totally amylopectin, being about 99% amylopectin or even 100% amylopectin, with only traces, if any, of amylose. Amylopectin is more stable in saturated salt environments because of its branched-chain structure.

On information and belief, the epichlorohydrin cross-linked, hydroxypropyl starch discussed in U.S. Pat. No. 4,822,500 is formulated from regular maize (low amylopectin, e.g., 74% amylopectin). In sharp contrast, the starch according to the present invention is formulated from a high amylopectin, usually 99% or greater, waxy maize starch to provide a drilling fluid additive having improved filtration control characteristics.

The starch derivative according to the present invention, when combined with xanthan gum in either a fresh water solution, or a non-saturated brine, or a saturated saline solution containing water soluble, sized salt particles, sized calcium carbonate particles, or combinations thereof, decreases fluid loss in the well being treated and improves the suspension characteristics thereof, decreases fluid loss in the well being treated and improves the suspension characteristics ofthe well fluid, whether in the drilling, completion or workover of the particular well.

Starch is a natural polymer containing an abundance of hydroxyl groups. Each androglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specific chemical contains two or more molecules capable of reacting with hydroxyl groups, there is the possibility of reacting two different hydroxyls resulting in cross-linking between hydroxyls on the same molecule or on different molecules.

The reaction conditions used in making cross-linked starches vary widely depending upon the specific bi- or polyfunctional reagent used for the cross-linking. In general, most of the reactions are run in aqueous suspensions of starch at temperatures ranging from room temperature up to about 50° C. Often an alkali such as sodium hydroxide is used to promote the reaction. The reactions are normally run under neutral to fairly alkaline conditions, but below the level which will peptize or swell the starch. If the cross-linking reaction is run in an aqueous suspension of starch, when the desired level of cross-linking (usually as measured by some type of viscosity or rheology test) is reached, the starch suspension is neutralized and the starch is filtered and washed with water to remove salts, any unreacted reagent, and other impurities produced by side reactions of the cross-linking reagent with water. Konigsberg U.S. Pat. No. 2,500,950 discloses the cross-linking of starch with epoxy-halogen compounds such as epichlorohydrin.

The chemistry of starch and the preparation of a multitude of derivatives thereof is well known. A book entitled "Modified Starches: Properties and Uses", by O. B. Wurzburg, 1986 (CRC Press, Inc.; Boca Raton, Fla., U.S.A.) is an excellent source for information on the preparation of starch derivatives.

The starch described in U.S. Pat. No. 4,822,500 is marketed by Texas United Chemical Corporation of Houston, Texas, under their tradename FL-7. The starch is an epichlorohydrin cross-linked, hydroxypropyl starch formulated from a low amylopectin maize starch. The starch exhibits a high degree of epichlorohydrin cross-linking, said to be cross-linked to such a degree that the viscosity is up to 100% of its maximum viscosity, all as discussed in Col. 5, lines 41–48 of U.S. Pat. No. 4,822,500.

In sharp contrast, the starch derivative according to the present invention is non-hydroxylpropylated and is formulated from high amylopectin (at or near 100% amylopectin content) waxy maize. The starch derivative of the present invention has only a moderate degree of epichlorohydrin cross-linking, such that it reaches a viscosity of only 40 to 60% of its maximum peak viscosity.

The starch used in the present invention is cross-linked with epichlorohydrin in a basic aqueous starch suspension at a temperature and for aperiod of time such that the Brabender viscosity of the suspension is within about 30 to 70% of the maximum peak viscosity which can be obtained in the starch suspension, as determined experimentally, using a Brabender measurement. Preferably the starch is cross-linked such that it reaches a viscosity of about 40 to 60% of the maximum peak viscosity. When the desired viscosity is reached, the cross-linking reaction is terminated. A Brabender Viscometer is a standard viscometer readily available on the open market and well known to those skilled in the art.

The starch according to the present invention is cross-linked to a moderate level with 1-chloro 2,3-epoxypropane. The level or degree of cross-linking is crucial to performance in terms of rheology, fluid loss and thermal stability within a given system.

The degree of cross-linking is dependent upon several tightly controlled processing variables, which include starch concentration given in terms of Buame', epichlorohydrin concentration, pH (dependent upon alkali concentration), agitation, temperature, pressure, and time. Each of these variables influence the rate of the cross-linking reaction, which in turn determines the optimum degree of cross-link within a certain period of time.

It has been determined that the optimum range of cross-link for the starch derivation according to the present invention is a moderate level as measured by a standard Brabender Amylograph, with a viscosity equal to 30 to 70% of the maximum BBU peak viscosity at a 6% solids level.

Samples of the starch derivative according to the present invention were tested in the laboratory, in comparison with the low amylopectin starch product, as a filtration control agent in various well fluids. The starches were tested and screened in a 12.5 lb./gal. fluid because it is more difficult to obtain filtration control while maintaining rheological properties in higher density (more solids) fluids. The fluids were rolled at 150° F. for 16 hours before testing. The filtration tests were conducted on a 10 micron core at 250° F. with 500 psi differential pressure.

Laboratory tests comparing similar concentrations of the high amylopectin and low amylopectin-derived starches indicate that the high amylopectin-derived starch is more efficient than the low amylopectin-derived starch at filtration control in high density saturated salt solutions.

As is well known in the art, the filtration properties of drilling fluids, sometimes referred to as drilling muds, must be carefully controlled. In order to prevent formation fluids from entering the borehole, the hydrostatic pressure of the mud column must be greater than the pressure of the fluids in the pores of the formation. Consequently, mud tends to invade permeable formations. Massive loss of mud into the formation usually does not occur, because the mud solids are filtered out onto the walls of the hole, forming a cake of relatively low permeability, through which only filtrate can pass. Muds must be treated to keep cake permeability as low as possible in order to maintain a stable borehole and to minimize filtration invasion of, and damage to, potentially productive horizons. Furthermore, high cake permeabilities result in thick filter cakes, which reduce the effective diameter of the hole and cause various problems, such as excessive torque when rotating the pipe, excessive drag when pulling it, and high swab and surge pressures. Thick cakes may cause the drill pipe to stick by a mechanism known as differential sticking, which may result in an expensive fishing job.

Two types of filtration are involved in drilling an oil well; static filtration, which takes place when the mud is not being circulated, and the filter cake grows undistributed, and dynamic filtration when the mud is being circulated and the growth of the filter cake is limited by the erosive action of the mud stream. Dynamic filtration rates are much higher than static rates, and most ofthe filtrate invading subsurface formations does so under dynamic conditions. The filtration properties of drilling fluids are usually evaluated and controlled by the API filter loss test, which is a static test, and is therefore not a reliable guide to downhole filtration unless the differences between static and dynamic filtration are appreciated, and the test results interpreted accordingly.

Static tests are sometimes conducted with paper, which are generally not reliable tests because oil and gas wells obviously are not drilled through paper. The laboratory tests which were conducted by the applicant, while static, were done using a 10 $\mu$ ceramic cylinder which closely approximates the sandstone formations which are commonly drilled through in the GulfofMexico, offshore Texas and Louisiana, and thus closely simulates actual drilling conditions.

The results of applicant's static filtration test are identified in the accompanying Tables 1–7, under the headings HTHP filtrate 250° F., loam core. The parameters related to filtration are spurt volume, measured in mL and total volume, measured in mL. Although the 10 $\mu$ ceramic cylinder is more accurate than the paper test, it should be appreciated that the results of such tests may differ up to 15 to 25% when repeated on the same sample.

It should be appreciated that a small volume of fluid lost to the formations is good, in that the formation will be softened up to facilitate the drilling of the formation. Consequently, it is not desirable that either the total volume or the spurt volume of the filtrate be zero. However, for comparative tests, the lower the number the better both for the total volume of the filtrate, as well as for the spurt volume of the filtrate.

The theory of filtration properties of drilling fluids is well known, and is described at length, for example, in Chapter 6, pages 277–312 of the above-identified book of George R. Gray et al., entitled *Composition and Properties of Oil Well Drilling Fluids*, Fourth Edition, and need not be described herein.

Referring now to the accompanying Table 1, there is a comparison of filtration control between the hydroxypropyl starch (low amylopectin) and the non-hydroxylpropyl starch (high amylopectin) in accord with the present invention. The data in Table 1 illustrates that use of the high amylopectin in a wide variety of drilling, completion and workover fluids can reduce the rate of fluid loss, including high density saturated NaCl brine solutions (i.e., 10 lb/gal NaCl Brine) in the presence of xanthan gum (i.e., N-VIS).

The ingredient shown as N-DRIL HT is a low amylopectin starch. The ingredient listed as N-VIS-P is comprised of one-fourth xanthan gum and three-fourths low amylopectin starch. Thus, when determining the concentration of low amylopectin in a fluid, one must add the lb/bbl of N-DRIL HT to three-fourths the lbs/bbl of N-VIS-P. For example, in Sample A of Table 1 the fluid contains 3 lb/bbl N-VIS-P and 8 lb/bbl N-DRIL-HT, thus the actual amount of low amylopectin in the fluid would be 10.25 lb/bbl (3×0.75=2.25; 8+2.25=10.25). In Tables 1 through 7 concentration of N-DRIL HT is set out and the total concentration of low amylopectin given in parenthesis (i.e., N-DRIL HT plus 0.75×N-VIS-P).

Similarly, in comparing different concentrations of the biopolymer xanthan gum in the different fluids one would compare the lb/bbl of N-VIS with one-fourth the lb/bbl of N-VIS P.

In the various Tables 1–7, when referring to the "10 lb/gal NaCl Brine", this indicates a saturated NaCl brine solution in which the addition of sized salt particles will not dissolve because the brine is already saturated. BARAPLUG 20, BARAPLUG 40 and BARAPLUG 50 are sized salt particles marketed by Baroid Drilling Fluids, Inc. of Houston, Tex., and which have mean particle sizes of 20, 40 and 50 microns respectively. Similarly, BARACARB 5 and BARACARB 50 are sized calcium carbonate particles which have a mean particle size of 5 and 50 microns respectively.

Optimum drilling fluids must be able to limit filtration under a variety of conditions. Tables 1 through 7 give the test results using a variety of drilling fluids. Table 1 provides a good summary of the different types of drilling fluid tested.

Sample A (containing 10.25 lb/bbl of low amylopectin starch and 0.75 lb/bbl of xanthan gum in fresh water with calcium carbonate particles) had a spurt volume of 1.8 and a total volume of 18.2. Sample B (containing 8 lb/bbl of high amylopectin and 1.0 lb/bbl of xanthan gum in fresh water with calcium carbonate particles) had a spurt volume of 2.0 and a total volume of 20.8. Thus, Samples A and B were similar in their capacity to limit filtration in fresh water solutions having calcium carbonate particles suspended therein. However, Sample A contained a 28% higher concentration of low amylopectin than the concentration of high amylopectin in Sample B.

Sample C (containing 10.75 lb/bbl of low amylopectin starch and 0.25 lb/bbl of xanthan gum in brine with calcium carbonate particles) had a spurt volume of 1.2 and a total volume of 17.2. Sample D (containing 8 lb/bbl of high amylopectin and 0.25 lb/bbl of xanthan gum in brine with calcium carbonate particles) had a spurt volume of 1.8 and a total volume of 16.2. Thus, Samples C and D were also similar in their capacity to limit filtration, even though Sample C contained a 34% higher concentration of low amylopectin than the concentration of high amylopectin in Sample D.

Sample E (containing 11.5 lb/bbl of low amylopectin starch and 0.5 lb/bbl of xanthan gum in saturated brine with suspended sodium chloride particles) had a spurt volume of 3.2 and a total volume of22.2. Sample F (containing 10 lb/bbl of high amylopectin and 0.25 lb/bbl of xanthan gum in saturated brine with suspended sodium chloride particles) had a spurt volume of 2.8 and a total volume of 18.8. Thus, Samples E and F were similar in their capacity to limit filtration in saturated salt solutions, even though Sample E contained a 15% higher concentration of low amylopectin than the concentration of high amylopectin in Sample F and twice as much xanthan gum as Sample F.

Sample G (containing 8.75 lb/bbl of low amylopectin starch and 0.25 lb/bbl of xanthan gum in saturated brine with a high density of suspended sodium chloride particles) had a spurt volume of 3.2 and a total volume of 31.2. Sample H (containing 8 lb/bbl of high amylopectin and 0.25 lb/bbl of xanthan gum in saturated brine with a high density of suspended sodium chloride particles) had a spurt volume of 1.4 and a total volume of 18.6. These results illustrate that the high amylopectin is more effective at filtration control than the low amylopectin and is particularly effective in high density salt solutions.

The data in Table 2 illustrates that the use of xanthan gum in cooperation with the high amylopectin in drilling and workover fluids can further reduce the rate of fluid loss in fresh water solutions.

Table 2 compares fluids that contain the low and high amylopectin starch in combination with xanthan gum in fresh water. The results given in Table 2 illustrate that low concentrations of the high amylopectin (4–6 lb/bbl) can be used in drilling, workover and completion fluids while retaining the desired filtration control. However, increased concentrations of the xanthan gum are needed in these fluids to maintain the appropriate viscosity and suspension properties of the fluids (i.e., yield point). For example, at low concentrations of amylopectin starch (see Samples C–F of Table 2) the concentration of xanthan gum becomes very important in the control of the yield point ofthe fluid. Samples C and E both contain 4 lb/bbl of high amylopectin, with Sample C having 1.25 lb/bbl of xanthan gum and Sample E having 0.75 lb/bbl of xanthan gum. The yield point of Sample C was 24 lb/100 $ft^2$ and the yield point of Sample E was 13 lb/100 $ft^2$. Desirable yield points for the drilling, workover and completion fluids typicallyrange from 18 to 40 lb/100 $ft^2$. Similarly, Samples D and F both contain 61b/bbl of high amylopectin, with Sample D having 1.25 lb/bbl of xanthan gum and Sample F having 0.75 lb/bbl of xanthan gum. The yield point of Sample D was 25 lb/100 ft$^2$ and the yield point of Sample F was 18 lb/100 ft$^2$. At the higher concentrations of amylopectin starch (i.e., 81b/bbl), the yield point was less sensitive to the concentration of xanthan gum as seen in Sample H having a xanthan gum concentration of 0.75 lb/bbl and a yield point of 20 lb/100 ft$^2$.

Table 3 illustrates the increased efficiency of the high amylopectin versus the low amylopectin in the presence of xanthan gum in saturated brine. For example, Sample A (containing 8.75 lb/bbl of low amylopectin and 0.25 lb/bbl of xanthan gum) is less efficient at controlling total volume loss than is either Sample B (containing 6 lb/bbl of high amylopectin and 0.25 lb/bbl of xanthan gum) or Sample C (containing 8 lb/bbl of high amylopectin and 0.25 lb/bbl of xanthan gum). Sample A exhibits a total volume of 32, while Sample B and C have total volumes of 22.2 and 16.2 respectively.

Table 4 compares three saturated salt fluids with suspended salt particles containing low amylopectin at 7.5, 9.5 and 11.5 lb/bbl with a variety of fluids containing 6–10 lb/bbl of the high amylopectin. The high amylopectin containing fluids were consistently as good or better than the fluids made with the low amylopectin at controlling fluid loss.

Table 5 compares different concentrations of high and low amylopectin solutions containing 0.25 lb/bbl of xanthan gum in saturated salt solutions having a high density of suspended sodium chloride particles. Samples A, B and C have 6.75, 8.75 and 10.75 lb/bbl of low amylopectin respectively. One of the problems often encountered with high density fluids is that they exhibit unacceptable rheological properties. For example, Sample C having 10.75 lb/bbl of low amylopectin exhibits a yield point of 59. Yield point is a measure of fluid viscosity and the suspension properties of the fluid. Yield points over about 40 lb/ft$^2$ are unacceptable for a drilling or workover fluid to be used in the field. Thus, in high density fluids it is an advantage to be able to reduce the concentration of amylopectin and thereby decrease the yield point of the fluid while maintaining adequate filtration control.

The results of Table 5 demonstrate that the high amylopectin gives better filtration control at lower concentrations than the low amylopectin in high density saturated salt solutions. For example, Sample A having 6.75 lb/bbl of low amylopectin gave a spurt volume of 4.0 and a total volume of 84 as compared to the spurt volume of 3.0 and total volume of 34.6 given by Sample D having 4 lb/bbl of high amylopectin. Likewise, Samples E and G having 6 lb/bbl of high amylopectin gave at least as good filtration control as did Sample B having 8.75 lb/bbl of low amylopectin.

Tables 1 through 5 provide data on various drilling, workover and completion fluids incorporating a preferred preparation of the high amylopectin. Tables 6 and 7 provide data on the characteristics of some of the different preparations of the low and high amylopectin.

In Table 6, Samples A, B and C are low amylopectin containing fluids in which the starch has been carboxymethylated. It is apparent from the spurt volume and total volume of these samples that carboxymethylation ofthe amylopectin reduces the filtration control properties of these samples. Sample D represents a low amylopectin preparation that was not hydroxypropylated like the N-DRIL HT. Sample D had a similar spurt volume and total volume as the N-DRIL HT sample, but the yield point was substantially higher for the non-hydroxypropylated sample (i.e., 50 lb/ft$^2$versus 39 lb/ft$^2$).

The second portion of Table 6 illustrates the effectiveness of high amylopectin samples with different levels of crosslinking in saturated salt solutions containing a high density of sodium chloride particles. Although all of the yield points of these solutions are too high to be of practical value in the field, the mean value of the total volumes of the lightly crosslinked (Samples F, H and J), the moderately crosslinked (Samples E, I and K) and the highly crosslinked (Sample G) high amylopectin samples were lower than the total volume of the low amylopectin sample.

Table 7 compares similar samples to those investigated in Table 6 in fresh water fluids. Samples L, M, N, C, O, and P all represent low amylopectin preparations where the amylopectin and amylose have been carboxymethylated. In fresh water these fluids have an acceptable yield point and give reasonable filtrate control. Samples Q and R represent high amylopectin containing solutions in fresh water. These two samples have acceptable yield points and reasonable filtrate control. Sample Q is lightly crosslinked and Sample R is moderately crosslinked. In fresh water the moderately crosslinked Sample R has a better yield point and filtrate control than the lightly crosslinked Sample Q.

In summary, the test results shown in Tables 1–7 demonstrate that use of the high amylopectin drilling, completion and workover fluids can reduce the rate of fluid loss. The use of high amylopectin in saturated NaCl brine solutions having a high density of sodium chloride particles is particularly important because of the difficulty encountered with currently available low amylopectin fluids in maintaining reasonable filtration control and desirable rheological properties under those conditions. The data shown in Tables 1–7 conclusively demonstrate the improved efficiency of the high amylopectin-derived starch, and the improved combination of such starch with the xanthan gum in a saturated salt solution for use in drilling fluids for drilling, completion and work-over of oil and gas wells.

TABLE 1

| Sample # | A | B | C | D | E | F | G | H |
|---|---|---|---|---|---|---|---|---|
| Fresh water, bbl | 0.95 | 0.95 | — | — | — | — | — | — |
| 10 lb/gal NaCl Brine, bbl | — | — | 0.8 | 0.8 | 0.94 | 0.94 | 0.69 | 0.69 |
| N-VIS, lb | — | 1 | — | 0.25 | — | 0.25 | — | 0.25 |
| N-VIS P, lb | 3 | — | 1 | — | 2 | — | 1 | — |
| N-DRIL HT (actual), lb | 8 (10.25) | — | 10 (10.75) | — | 10 (11.5) | — | 8 (8.75) | — |
| High Amylopectin, lb | — | 8 | — | 8 | — | 10 | — | 8 |
| BARACARB ® 5, LB | 20 | 20 | 25 | 25 | — | — | — | — |
| BARACARB 50, LB | 25 | 25 | 164 | 164 | — | — | — | — |
| BARAPLUG ™ 20, lb | — | — | — | — | 20 | 20 | 90 | 90 |

TABLE 1-continued

| Sample # | A | B | C | D | E | F | G | H |
|---|---|---|---|---|---|---|---|---|
| BARAPLUG 40, lb | — | — | — | — | 16 | 16 | 76 | 76 |
| BARAPLUG 50, lb | — | — | — | — | 10 | 10 | 70 | 70 |
| BARABUF ®, lb | 0.1 | 0.1 | 3.0 | 3.0 | 3.0 | 3.0 | 3.0 | 3.0 |
| Rolled @ 150° F., hr | 16 | 16 | 16 | 16 | 16 | 16 | 16 | 16 |
| Stirred, min | 15 | 15 | 15 | 15 | 15 | 15 | 15 | 15 |
| Temperature, ° F. | 120 | 120 | 120 | 120 | 120 | 120 | 120 | 120 |
| Mud weight, lb/gal | 9.0 | 9.0 | 12.5 | 12.5 | 10.5 | 10.5 | 12.5 | 12.5 |
| Plastic viscosity, cP | 13 | 11 | 41 | 26 | 25 | 23 | 57 | 56 |
| Yield point, lb/100 $ft^2$ | 23 | 24 | 39 | 26 | 25 | 19 | 38 | 42 |
| 10 sec gel, lb/100 $ft^2$ | 5 | 10 | 15 | 7 | 5 | 4 | 7 | 7 |
| 10 sec gel, lb/100 $ft^2$ | 7 | 12 | 17 | 9 | 6 | 6 | 9 | 9 |
| pH | 9.8 | 9.7 | 8.9 | 9.0 | 9.2 | 8.8 | 9.0 | 8.9 |
| HTHP filtrate @ 250° F., 10 μm core | | | | | | | | |
| Spurt volume, mL | 1.8 | 2.0 | 1.2 | 1.8 | 3.2 | 2.8 | 3.2 | 1.4 |
| Total volume, mL | 18.2 | 20.8 | 17.2 | 16.2 | 22.2 | 18.8 | 31.2 | 18.6 |
| FANN 35 Dial Readings | | | | | | | | |
| 600 rpm | 49 | 46 | 121 | 78 | 75 | 65 | 152 | 154 |
| 300 rpm | 36 | 35 | 80 | 52 | 50 | 42 | 95 | 98 |
| 200 rpm | 30 | 30 | 64 | 40 | 40 | 32 | 73 | 75 |
| 100 rpm | 22 | 24 | 26 | 29 | 27 | 21 | 46 | 48 |
| 6 rpm | 7 | 10 | 17 | 8 | 6 | 5 | 8 | 9 |
| 3 rpm | 5 | 12 | 16 | 7 | 5 | 4 | 7 | 7 |

TABLE 2

| Sample # | A | B | C | D | E | F | G | H | I |
|---|---|---|---|---|---|---|---|---|---|
| Fresh water, bbl | 0.95 | 0.95 | 0.95 | 0.95 | 0.95 | 0.95 | 0.95 | 0.95 | 0.95 |
| N-VIS, lb | — | — | 1.25 | 1.25 | 0.75 | 0.75 | 1.0 | 0.75 | 1.0 |
| N-VIS P, lb | 2 | 3 | — | — | — | — | — | — | — |
| N-DRIL HT (actual), lb | 8 (9.5) | 8 (10.25) | — | — | — | — | — | — | — |
| High Amylopectin, lb | — | — | 4 | 6 | 4 | 6 | 8 | 9 | 10 |
| BARACARB 5, lb | 20 | 20 | 20 | 20 | 20 | 20 | 20 | 20 | 20 |
| BARACARB 50, lb | 25 | 25 | 25 | 25 | 25 | 25 | 25 | 25 | 25 |
| BARABUF, lb | 0.1 | 0.1 | 0.1 | 0.1 | 0.1 | 0.1 | 0.1 | 0.1 | 0.1 |
| Rolled @ 150° F., hr | 16 | 16 | 16 | 16 | 16 | 16 | 16 | 16 | 16 |
| Stirred, min | 15 | 15 | 15 | 15 | 15 | 15 | 15 | 15 | 15 |
| Temperature, ° F. | 120 | 120 | 120 | 120 | 120 | 120 | 120 | 120 | 120 |
| Mud weight, lb/gal | 9.0 | 9.0 | 9.0 | 9.0 | 9.0 | 9.0 | 9.0 | 9.0 | 9.0 |
| Plastic viscosity, cP | 11 | 13 | 8 | 10 | 6 | 8 | 11 | 15 | 16 |
| Yield point, lb/100 $ft^2$ | 11 | 23 | 24 | 25 | 13 | 18 | 24 | 20 | 32 |
| 10 sec gel, lb/100 $ft^2$ | 2 | 5 | 11 | 10 | 5 | 6 | 10 | 7 | 11 |
| 10 sec gel, lb/100 $ft^2$ | 3 | 7 | 14 | 14 | 7 | 8 | 12 | 9 | 13 |
| pH | 9.6 | 9.8 | 9.7 | 9.6 | 9.8 | 9.8 | 9.7 | 9.6 | 9.7 |
| HTHP filtrate @ 250° F., 10 μm core | | | | | | | | | |
| Spurt volume, mL | 2.0 | 1.8 | 1.8 | 1.8 | 4.2 | 3.0 | 2.0 | 2.0 | 1.8 |
| Total volume, mL | 20.0 | 18.2 | 24.2 | 22.2 | 25.8 | 22.6 | 20.8 | 19.2 | 16.6 |
| FANN 35 Dial Readings | | | | | | | | | |
| 600 rpm | 33 | 49 | 40 | 45 | 25 | 34 | 46 | 50 | 64 |
| 300 rpm | 22 | 36 | 32 | 35 | 19 | 26 | 35 | 35 | 48 |
| 200 rpm | 17 | 30 | 28 | 30 | 15 | 20 | 30 | 30 | 42 |
| 100 rpm | 12 | 22 | 24 | 25 | 11 | 17 | 24 | 24 | 32 |
| 6 rpm | 3 | 7 | 13 | 14 | 5 | 7 | 11 | 8 | 13 |
| 3 rpm | 2 | 5 | 11 | 11 | 4 | 5 | 10 | 7 | 11 |

TABLE 3

| Sample # | A | B | C | D | E | F |
|---|---|---|---|---|---|---|
| 10 lb/gal NaCl Brine, bbl | 0.80 | 0.80 | 0.80 | 0.80 | 0.80 | 0.80 |
| N-VIS, lb | — | 0.25 | 0.25 | 0.5 | 0.5 | — |
| N-VIS P, lb | 1 | — | — | — | — | 1 |
| N-DRIL HT (actual), lb | 8 (8.75) | — | — | — | — | 10 (10.75) |
| High Amylopectin, lb | — | 6 | 8 | 6 | 8 | — |
| BARACARB 5, lb | 25 | 25 | 25 | 25 | 25 | 25 |
| BARACARB 50, lb | 164 | 164 | 164 | 164 | 164 | 164 |

TABLE 3-continued

| Sample # | A | B | C | D | E | F |
|---|---|---|---|---|---|---|
| BARABUF, lb | 3.0 | 3.0 | 3.0 | 3.0 | 3.0 | 3.0 |
| Rolled @ 150° F., hr | 16 | 16 | 16 | 16 | 16 | 16 |
| Stirred, min | 15 | 15 | 15 | 15 | 15 | 15 |
| Temperature, ° F. | 120 | 120 | 120 | 120 | 120 | 120 |
| Mud weight, lb/gal | 12.5 | 12.5 | 12.5 | 12.5 | 12.5 | 12.5 |
| Plastic viscosity, cP | 30 | 20 | 26 | 28 | 40 | 41 |
| Yield point, lb/100 $ft^2$ | 29 | 20 | 26 | 28 | 42 | 39 |
| 10 sec gel, lb/100 $ft^2$ | 13 | 5 | 7 | 7 | 9 | 15 |
| 10 sec gel, lb/100 $ft^2$ | 15 | 7 | 9 | 9 | 12 | 17 |
| pH | 9.1 | 9.2 | 9.0 | 8.9 | 9.0 | 8.9 |
| HTHP filtrate @ 250° F., 10 $\mu$m core | | | | | | |
| Spurt volume, mL | 2.0 | 1.8 | 1.8 | 2.0 | 1.8 | 1.2 |
| Total volume, mL | 32 | 22.2 | 16.2 | 22.0 | 14.2 | 17.2 |
| FANN 35 Dial Readings | | | | | | |
| 600 rpm | 89 | 60 | 78 | 84 | 122 | 121 |
| 300 rpm | 59 | 40 | 52 | 56 | 82 | 80 |
| 200 rpm | 48 | 30 | 40 | 44 | 66 | 64 |
| 100 rpm | 35 | 21 | 29 | 31 | 47 | 46 |
| 6 rpm | 15 | 6 | 8 | 8 | 13 | 17 |
| 3 rpm | 15 | 5 | 7 | 7 | 10 | 16 |

TABLE 4

| Sample # | A | B | C | D | E | F | G | H | I | J |
|---|---|---|---|---|---|---|---|---|---|---|
| 10 lb/gal NaCl Brine, bbl | 0.94 | 0.94 | 0.94 | 0.94 | 0.94 | 0.94 | 0.94 | 0.94 | 0.94 | 0.94 |
| N-VIS, lb | — | — | — | 0.50 | 0.50 | 0.75 | 0.75 | 0.75 | 0.50 | 0.25 |
| N-VIS P, lb | 2 | 2 | 2 | — | — | — | — | — | — | — |
| N-DRIL HT (actual), lb | 6 (7.5) | 8 (9.5) | 10 (11.5) | — | — | — | — | — | — | — |
| High Amylopectin, lb | — | — | — | 6 | 8 | 6 | 8 | 10 | 10 | 10 |
| BARAPLUG 20, lb | 20 | 20 | 20 | 20 | 20 | 20 | 20 | 20 | 20 | 20 |
| BARAPLUG 40, lb | 16 | 16 | 16 | 16 | 16 | 16 | 16 | 16 | 16 | 16 |
| BARAPLUG 50, LB | 10 | 10 | 10 | 10 | 10 | 10 | 10 | 10 | 10 | 10 |
| BARABUF, lb | 3 | 3 | 3 | 3 | 3 | 3 | 3 | 3 | 3 | 3 |
| Rolled @ 150° F., hr | 16 | 16 | 16 | 16 | 16 | 16 | 16 | 16 | 16 | 16 |
| Stirred, min | 15 | 15 | 15 | 15 | 15 | 15 | 15 | 15 | 15 | 15 |
| Temperature, ° F. | 120 | 120 | 120 | 120 | 120 | 120 | 120 | 120 | 120 | 120 |
| Mud weight, lb/gal | 10.5 | 10.5 | 10.5 | 10.5 | 10.5 | 10.5 | 10.5 | 10.5 | 10.5 | 10.5 |
| Plastic viscosity, cP | 14 | 19 | 25 | 13 | 18 | 14 | 20 | 28 | 27 | 23 |
| Yield point, lb/100 $ft^2$ | 15 | 21 | 25 | 15 | 23 | 20 | 28 | 42 | 36 | 19 |
| 10 sec gel, lb/100 $ft^2$ | 3 | 3 | 5 | 4 | 5 | 5 | 7 | 10 | 7 | 4 |
| 10 sec gel, lb/100 $ft^2$ | 5 | 5 | 6 | 6 | 7 | 7 | 10 | 12 | 9 | 6 |
| pH | 9.1 | 9.2 | 8.9 | 9.0 | 9.0 | 9.1 | 9.0 | 8.9 | 9.0 | 8.8 |
| HTHP filtrate @ 250° F., 10 $\mu$m core | | | | | | | | | | |
| Spurt volume, mL | 4.8 | 4.0 | 3.2 | 4.2 | 4.0 | 4.6 | 4.0 | 3.0 | 3.2 | 2.8 |
| Total volume, mL | 24.2 | 23.4 | 22.2 | 38.6 | 23.8 | 36.6 | 23.0 | 19.6 | 21.6 | 18.8 |
| FANN 35 Dial Readings | | | | | | | | | | |
| 600 rpm | 43 | 59 | 75 | 41 | 59 | 48 | 68 | 98 | 90 | 65 |
| 300 rpm | 29 | 40 | 50 | 28 | 41 | 34 | 48 | 70 | 63 | 42 |
| 200 rpm | 22 | 32 | 40 | 21 | 33 | 28 | 40 | 58 | 50 | 32 |
| 100 rpm | 16 | 22 | 27 | 15 | 23 | 20 | 29 | 42 | 36 | 21 |
| 6 rpm | 4 | 5 | 6 | 5 | 6 | 7 | 9 | 12 | 9 | 5 |
| 3 rpm | 3 | 3 | 5 | 4 | 5 | 5 | 7 | 10 | 7 | 4 |

TABLE 5

| Sample # | A | B | C | D | E | F | G | H |
|---|---|---|---|---|---|---|---|---|
| 10 lb/gal NaCl Brine, bbl | 0.69 | 0.69 | 0.69 | 0.69 | 0.69 | 0.69 | 0.69 | 0.69 |
| N-VIS, lb | — | — | — | 0.25 | 0.25 | 0.25 | 0.25 | 0.25 |
| N-VIS P, lb | 1 | 1 | 1 | — | — | — | — | — |
| N-DRIL HT (actual), lb | 6 (6.75) | 8 (8.75) | 10 (10.75) | — | — | — | — | — |
| High Amylopectin, lb | — | — | — | 4 | 6 | 8 | 6 | 8 |
| BARAPLUG 20, lb | 90 | 90 | 90 | 90 | 90 | 90 | 90 | 90 |
| BARAPLUG 40, lb | 76 | 76 | 76 | 76 | 76 | 76 | 76 | 76 |
| BARAPLUG 50, LB | 70 | 70 | 70 | 70 | 70 | 70 | 70 | 70 |

TABLE 5-continued

| Sample # | A | B | C | D | E | F | G | H |
|---|---|---|---|---|---|---|---|---|
| BARABUF, lb | 3.0 | 3.0 | 3.0 | 3.0 | 3.0 | 3.0 | 3.0 | 3.0 |
| Rolled @ 150° F., hr | 16 | 16 | 16 | 16 | 16 | 16 | 16 | 16 |
| Stirred, min | 15 | 15 | 15 | 15 | 15 | 15 | 15 | 15 |
| Temperature, ° F. | 120 | 120 | 120 | 120 | 120 | 120 | 120 | 120 |
| Mud weight, lb/gal | 12.5 | 12.5 | 12.5 | 12.5 | 12.5 | 12.5 | 12.5 | 12.5 |
| Plastic viscosity, cP | 41 | 57 | 81 | 40 | 41 | 57 | 39 | 56 |
| Yield point, lb/100 $ft^2$ | 26 | 38 | 59 | 20 | 26 | 47 | 25 | 42 |
| 10 sec gel, lb/l00 $ft^2$ | 5 | 7 | 12 | 6 | 6 | 6 | 5 | 7 |
| 10 sec gel, lb/100 $ft^2$ | 6 | 9 | 13 | 7 | 8 | 8 | 7 | 9 |
| pH | 8.9 | 9.0 | 9.0 | 8.9 | 9.0 | 8.9 | 8.9 | 9.0 |
| HTHP filtrate @ 250° F., 10 μm core | | | | | | | | |
| Spurt volume, mL | 4 | 3.2 | 2.4 | 3.0 | 3.0 | 3.0 | 2.0 | 1.4 |
| Total volume, mL | 84 | 31.2 | 19.6 | 34.6 | 26.0 | 19.0 | 26.0 | 18.6 |
| FANN 35 Dial Readings | | | | | | | | |
| 600 rpm | 108 | 152 | 221 | 100 | 108 | 161 | 103 | 154 |
| 300 rpm | 67 | 95 | 140 | 60 | 67 | 104 | 64 | 98 |
| 200 rpm | 50 | 73 | 108 | 46 | 51 | 80 | 49 | 75 |
| 100 rpm | 33 | 46 | 70 | 30 | 32 | 51 | 31 | 48 |
| 6 rpm | 7 | 8 | 15 | 6 | 7 | 9 | 6 | 9 |
| 3 rpm | 5 | 7 | 12 | 5 | 6 | 6 | 5 | 7 |

TABLE 6

| Sample # | N-DRIL HT | Sample A | Sample B | Sample C | Sample D |
|---|---|---|---|---|---|
| 10 lb/gal NaCl Brine, bbl | 0.69 | 0.69 | 0.69 | 0.69 | 0.69 |
| N-VIS, lb | — | 0.25 | 0.25 | 0.25 | 0.25 |
| N-VIS P, lb | 1 | — | — | — | — |
| N-DRIL HT (actual), lb | 8 (8.75) | — | — | — | — |
| Low Amylopectin, lb | — | 8.75 | 8.75 | 8.75 | 8.75 |
| BARAPLUG 20, lb | 90 | 90 | 90 | 90 | 90 |
| BARAPLUG 40, lb | 76 | 76 | 76 | 76 | 76 |
| BARAPLUG 50, LB | 70 | 70 | 70 | 70 | 70 |
| BARABUF, lb | 3.0 | 3.0 | 3.0 | 3.0 | 3.0 |
| Rolled @ 150° F., hr | 16 | 16 | 16 | 16 | 16 |
| Stirred, min | 15 | 15 | 15 | 15 | 15 |
| Temperature, ° F. | 120 | 120 | 120 | 120 | 120 |
| Mud weight, lb/gal | 12.5 | 12.5 | 12.5 | 12.5 | 12.5 |
| Plastic viscosity, cP | 58 | 64 | 52 | 60 | 70 |
| Yield point, lb/100 $ft^2$ | 39 | 48 | 40 | 37 | 50 |
| 10 sec gel, lb/100 $ft^2$ | 6 | 4 | 6 | 5 | 8 |
| 10 sec gel, lb/100 $ft^2$ | 8 | 7 | 8 | 7 | 10 |
| pH | 8.9 | 9.0 | 9.0 | 9.0 | 8.9 |
| HTHP filtrate @ 250° F., 10 μm core | | | | | |
| Spurt volume, mL | 3.0 | 7.0 | 5.0 | 6.0 | 3.6 |
| Total volume, mL | 29.0 | 69.0 | 79.0 | 54.0 | 23.6 |
| FANN 35 Dial Readings | | | | | |
| 600 rpm | 155 | 176 | 144 | 157 | 190 |
| 300 rpm | 97 | 112 | 92 | 97 | 120 |
| 200 rpm | 74 | 82 | 77 | 73 | 92 |
| 100 rpm | 47 | 56 | 50 | 46 | 60 |
| 6 rpm | 8 | 5 | 8 | 6 | 10 |
| 3 rpm | 6 | 4 | 7 | 5 | 7 |

| Sample # | Sample F | Sample H | Sample J | Sample E | Sample I | Sample K | Sample G |
|---|---|---|---|---|---|---|---|
| 10 lb/gal NaCl Brine, bbl | 0.69 | 0.69 | 0.69 | 0.69 | 0.69 | 0.69 | 0.69 |
| N-VIS, lb | — | 0.25 | 0.25 | 0.25 | 0.25 | 0.25 | 0.25 |
| N-VIS P, lb | — | — | — | — | — | — | — |
| N-DRIL HT (actual), lb | — | — | — | — | — | — | — |
| High Amylopectin, lb | 8.75 | 8.75 | 8.75 | 8.75 | 8.75 | 8.75 | 8.75 |
| BARAPLUG 20, lb | 90 | 90 | 90 | 90 | 90 | 90 | 90 |
| BARAPLUG 40, lb | 76 | 76 | 76 | 76 | 76 | 76 | 76 |
| BARAPLUG 50, LB | 70 | 70 | 70 | 70 | 70 | 70 | 70 |
| BARABUF, lb | 3.0 | 3.0 | 3.0 | 3.0 | 3.0 | 3.0 | 3.0 |
| Rolled @ 150° F., hr | 16 | 16 | 16 | 16 | 16 | 16 | 16 |
| Stirred, min | 15 | 15 | 15 | 15 | 15 | 15 | 15 |
| Temperature, ° F. | 120 | 120 | 120 | 120 | 120 | 120 | 120 |
| Mud weight, lb/gal | 12.5 | 12.5 | 12.5 | 12.5 | 12.5 | 12.5 | 12.5 |

TABLE 6-continued

| | | | | | | | |
|---|---|---|---|---|---|---|---|
| Plastic viscosity, cP | 57 | 68 | 75 | 68 | 76 | 75 | 64 |
| Yield point, lb/100 ft$^2$ | 40 | 46 | 65 | 57 | 74 | 66 | 50 |
| 10 sec gel, lb/100 ft$^2$ | 5 | 9 | 12 | 8 | 12 | 13 | 8 |
| 10 sec gel, lb/100 ft$^2$ | 7 | 11 | 15 | 10 | 15 | 15 | 9 |
| pH | 9.0 | 9.1 | 8.9 | 9.0 | 9.0 | 9.0 | 9.1 |
| HTHP filtrate @ 250° F., 10 μm core | | | | | | | |
| Spurt volume, mL | 4.0 | 3.6 | 2.2 | 4.0 | 2.6 | 2.3 | 3.0 |
| Total volume, mL | 16.4 | 25.4 | 20.2 | 24.0 | 15.4 | 18.6 | 14.6 |
| FANN 35 Dial Readings | | | | | | | |
| 600 rpm | 154 | 182 | 215 | 193 | 226 | 216 | 178 |
| 300 rpm | 97 | 114 | 140 | 125 | 150 | 141 | 114 |
| 200 rpm | 74 | 90 | 110 | 97 | 120 | 111 | 87 |
| 100 rpm | 46 | 58 | 72 | 62 | 80 | 73 | 56 |
| 6 rpm | 7 | 10 | 14 | 11 | 15 | 16 | 10 |
| 3 rpm | 5 | 8 | 12 | 8 | 11 | 13 | 8 |

TABLE 7

| Sample # | N-DRIL HT | Sample L | Sample M | Sample N | Sample C | Sample O | Sample P |
|---|---|---|---|---|---|---|---|
| Fresh water, bbl | 0.74 | 0.74 | 0.74 | 0.74 | 0.74 | 0.74 | 0.74 |
| N-VIS P, lb | 1 | — | — | — | — | — | — |
| N-DRIL HT, lb | 8 | — | — | — | — | — | 0.25 |
| | (8.75) | | | | | | |
| N-VIS, lb | — | 0.25 | 0.25 | 0.25 | 0.25 | 0.25 | 8.75 |
| Low Amylopectin, lb | — | 8.75 | 8.75 | 8.75 | 8.75 | 8.75 | 25 |
| BARACARB 5, lb | 25 | 25 | 25 | 25 | 25 | 25 | 212 |
| BARACARB 50, lb | 212 | 212 | 212 | 212 | 212 | 212 | 0.1 |
| BARABUF, lb | 0.1 | 0.1 | 0.1 | 0.1 | 0.1 | 0.1 | |
| | | | | | | | 16 |
| Rolled @ 150° F., hr | 16 | 16 | 16 | 16 | 16 | 16 | 15 |
| Stirred, min | 15 | 15 | 15 | 15 | 15 | 15 | 120 |
| Temperature, ° F. | 120 | 120 | 120 | 120 | 120 | 120 | 12 |
| Mud weight, lb/gal | 12 | 12 | 12 | 12 | 12 | 12 | 42 |
| Plastic viscosity, cP | 23 | 27 | 40 | 33 | 31 | 30 | 28 |
| Yield point, lb/100 ft$^2$ | 20 | 14 | 36 | 18 | 14 | 25 | 4 |
| 10 sec gel, lb/100 ft$^2$ | 5 | 2 | 12 | 4 | 3 | 4 | 6 |
| 10 sec gel, lb/100 ft$^2$ | 7 | 3 | 14 | 6 | 4 | 6 | 9.9 |
| pH | 9.4 | 9.9 | 9.4 | 9.7 | 9.8 | 9.9 | |
| HTHP filtrate @ 250° F., 10 μm core | | | | | | | |
| Spurt volume, mL | 1.4 | 2.0 | 2.5 | 3.0 | 2.0 | 1.8 | 2.4 |
| Total volume, mL | 30.2 | 14.0 | 16.8 | 15.2 | 16 | 14.4 | 16.6 |
| FANN 35 Dial Readings | | | | | | | |
| 600 rpm | 66 | 68 | 116 | 84 | 76 | 85 | 112 |
| 300 rpm | 43 | 41 | 76 | 51 | 45 | 55 | 70 |
| 200 rpm | 34 | 31 | 57 | 40 | 34 | 40 | 52 |
| 100 rpm | 24 | 20 | 49 | 25 | 20 | 25 | 31 |
| 6 rpm | 9 | 3 | 13 | 5 | 4 | 5 | 5 |
| 3 rpm | 8 | 2 | 12 | 4 | 3 | 4 | 4 |

| Sample # | Sample Q | Sample R | Sample J | Sample K |
|---|---|---|---|---|
| Fresh water, bbl | 0.74 | 0.74 | — | — |
| 10 lb/gal NaCl Brine, bbl | — | — | 0.8 | 0.8 |
| N-VIS, lb | 0.25 | 0.25 | 0.25 | 0.25 |
| High Amylopectin, lb | 8.75 | 8.75 | 8.75 | 8.75 |
| BARACARB 5, lb | 25 | 25 | 25 | 25 |
| BARACARB 50, lb | 212 | 212 | 164 | 164 |
| BARABUF, lb | 0.1 | 0.1 | 0.1 | 0.1 |
| Rolled @ 150° F., hr | 16 | 16 | 16 | 16 |
| Stirred, min | 15 | 15 | 15 | 15 |
| Temperature, ° F. | 120 | 120 | 120 | 120 |
| Mud weight, lb/gal | 12 | 12 | 12 | 12 |
| Plastic viscosity, cP | 27 | 17 | 45 | 48 |
| Yield point, lb/100 ft$^2$ | 22 | 20 | 57 | 63 |
| 10 sec gel, lb/100 ft$^2$ | 4 | 4 | 16 | 16 |
| 10 sec gel, lb/100 ft$^2$ | 6 | 6 | 19 | 19 |
| pH | 9.8 | 10.0 | 9.3 | 9.5 |
| HTHP filtrate @ 250° F., 10 μm core | | | | |
| Spurt volume, mL | 2.0 | 2.0 | — | — |
| Total volume, mL | 18.0 | 11.6 | — | — |

TABLE 7-continued

| FANN 35 Dial Readings | | | | |
|---|---|---|---|---|
| 600 rpm | 76 | 54 | 147 | 159 |
| 300 rpm | 49 | 37 | 102 | 111 |
| 200 rpm | 38 | 30 | 83 | 90 |
| 100 rpm | 25 | 21 | 59 | 65 |
| 6 rpm | 5 | 5 | 19 | 22 |
| 3 rpm | 4 | 4 | 17 | 20 |

What is claimed:

1. A drilling fluid for drilling oil and gas wells in earth formations, comprising:

a first component selected from the group consisting of fresh water, a non-saturated, aqueous saline solution and a saturated, aqueous saline solution;

a second component selected from the group consisting of sized calcium carbonate and water soluble particle salt, and combinations thereof, xanthan gum; and a non-hydroxypropylated, epichlorohydrin cross-linked, high amylopectin, waxy maize starch.

2. The drilling fluid according to claim 1, wherein starch is at least 99% amylopectin.

3. A fluid for treating oil and gas wells in earth formations, comprising:

a first component selected from the group consisting of fresh water, a non-saturated, aqueous saline solution and a saturated, aqueous saline solution;

a second component selected from the group consisting of sized calcium carbonate and water soluble particle salt, and combinations thereof;

xanthan gum; and a non-hydroxypropylated, epichlorohydrin cross-linked, high amylopectin, waxy maize starch.

4. The fluid according to claim 3, wherein starch is at least 99% amylopectin.

5. A fluid for working over oil and gas wells in earth formations, comprising:

a first component selected from the group consisting of fresh water, a non-saturated, aqueous saline solution and a saturated, aqueous saline solution;

a second component selected from the group consisting of sized calcium carbonate and a water soluble particle salt, and combinations thereof;

xanthan gum; and a non-hydroxypropylated, epichlorohydrin cross-linked, high amylopectin, waxy maize starch.

6. The fluid according to claim 5, wherein starch is at least 99% amylopectin.

7. A well treating fluid comprising:

a saturated aqueous saline solution;

a water soluble particulate salt which is insoluble in the saturated aqueous saline;

a xanthan gum; and a non-hydroxypropylated, epichlorohydrin cross-linked, high amylopectin starch.

8. The well treating fluid of claim 7, wherein the saturated saline solution comprises about 10 lb/bbl of NaCl.

9. The well treating fluid of claim 7, wherein the water soluble particulate salt comprises sized calcium carbonate particles.

10. The well treating fluid of claim 7, wherein the concentration of the xanthan gum is from about 0.25 lb/bbl to about 1.25 lb/bbl of the well treating fluid.

11. The well treating fluid of claim 7, wherein the starch is at least 99% amylopectin.

12. The well treating fluid of claim 7, wherein the concentration of the starch is from about 6 lb/bbl to about 10 lb/bbl of well treating fluid.

13. The well treating fluid of claim 7, wherein the epichlorohydrin cross-linked starch is cross-linked to the extent that the viscosity of the starch in aqueous suspension is from about 40% to about 60% of the maximum viscosity which can be obtained in the aqueous suspension.

14. The well treating fluid of claim 7, wherein the starch is moderately cross-linked with epichlorohydrin, reaching a viscosity of 30% to 70% of its maximum peak viscosity as determined by a Brabender Viscosity Unit.

* * * * *